United States Patent [19]
Searcy et al.

[11] Patent Number: 5,003,603
[45] Date of Patent: * Mar. 26, 1991

[54] VOICE RECOGNITION SYSTEM

[76] Inventors: Gus Searcy, 5067 Cumberland Drive, Cypress, Calif. 90630; Franz Kavan, 9811 Norlain, Downey, Calif. 90241

[*] Notice: The portion of the term of this patent subsequent to Feb. 26, 2007 has been disclaimed.

[21] Appl. No.: 642,299

[22] Filed: Aug. 20, 1984

[51] Int. Cl.$^5$ ............................................. G10L 5/00
[52] U.S. Cl. ...................................................... 381/43
[58] Field of Search ................................... 381/41–43, 381/51; 364/513, 513.5

[56] References Cited

U.S. PATENT DOCUMENTS

| | | | |
|---|---|---|---|
| 3,553,372 | 1/1971 | Wright | 381/43 |
| 3,812,291 | 5/1974 | Brodes et al. | 381/43 |
| 3,940,565 | 2/1976 | Lindenberg | 381/43 |
| 4,405,639 | 1/1985 | Mosier et al. | 381/51 |
| 4,412,098 | 10/1983 | An | 381/43 |

Primary Examiner—Emanuel S. Kemeny
Attorney, Agent, or Firm—I. Michael Bak-Boychuk

[57] ABSTRACT

A method and apparatus are disclosed for recognizing spoken commands uttered by a user and for generating responsive control signals once the command is recognized. In accordance with this disclosure the audio signal is converted into a series of count bytes representing the time between the audio signal zero crossings, and all the count bytes of the full command are then segmented into equal temporal groups histogram and sorted within each segment into a set of frequency class intervals which are based on a computation of substantially equal byte activity in all the words comprising the command lexicon. In this manner, lower and higher frequency groups are selected for equal significance. The uttered words are then compared against stored words similarly transformed according to segment and frequency interval and if the comparison conditions are satisfied the command is executed; if not, an indication is provided to the user to repeat the command.

9 Claims, 4 Drawing Sheets

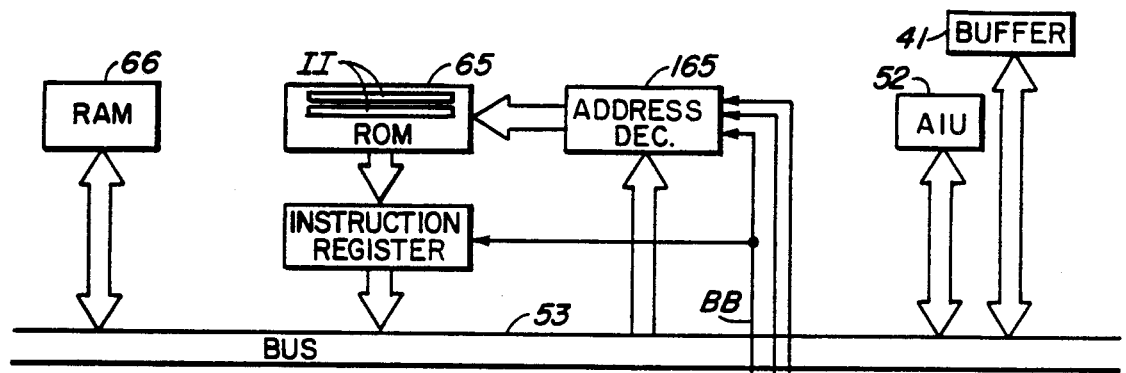
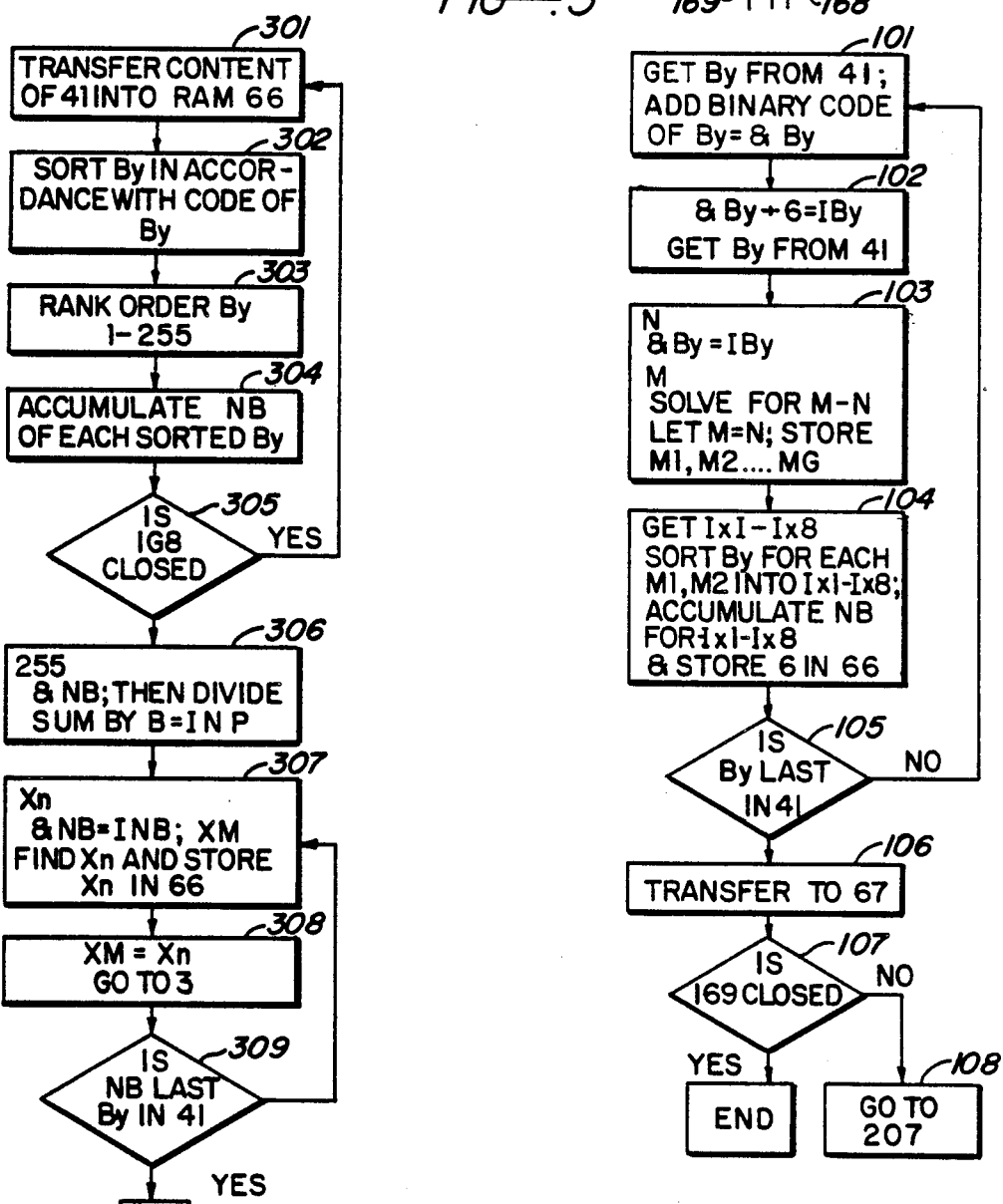
FIG—4    FIG—6

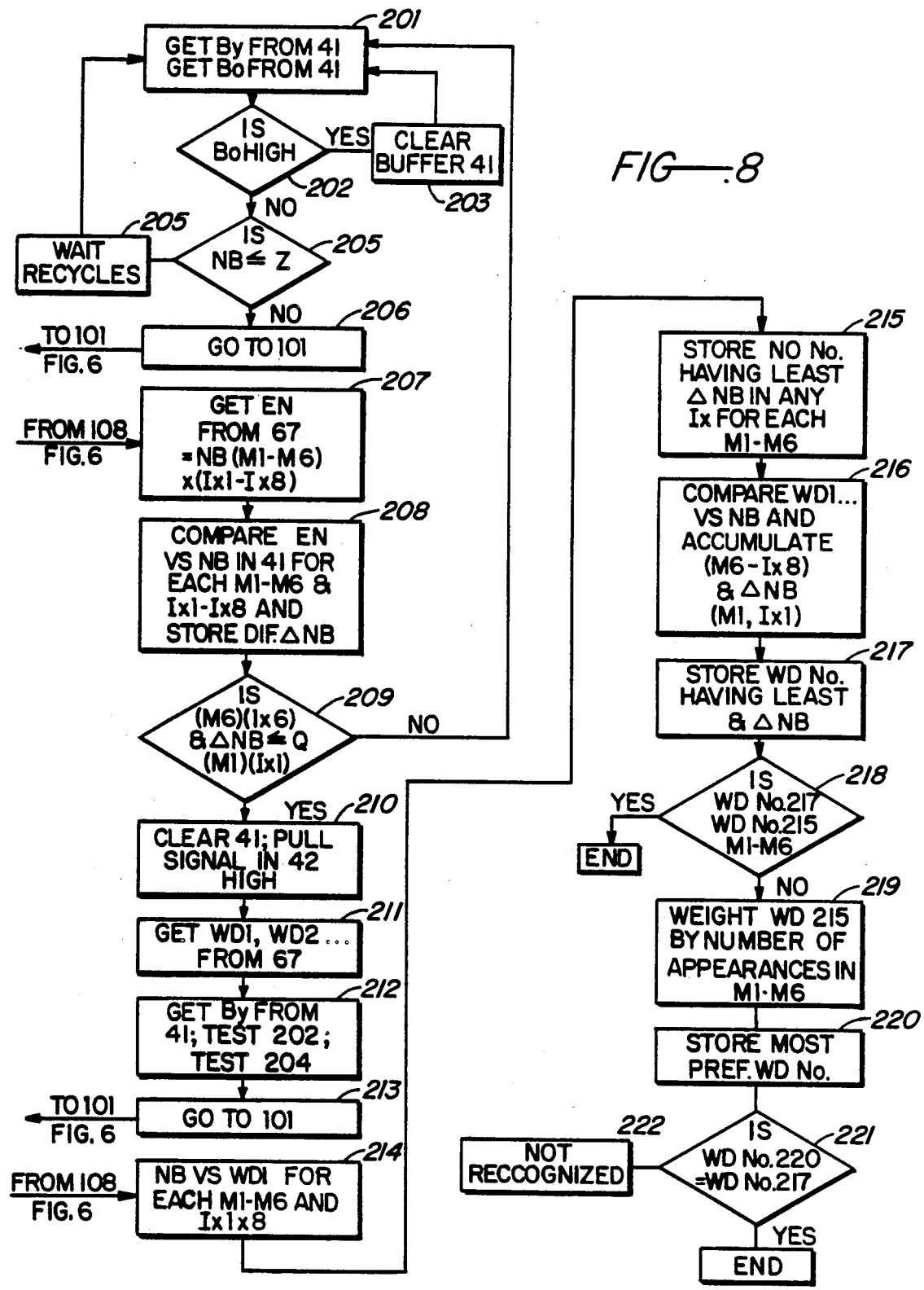
FIG—8

FIG—5
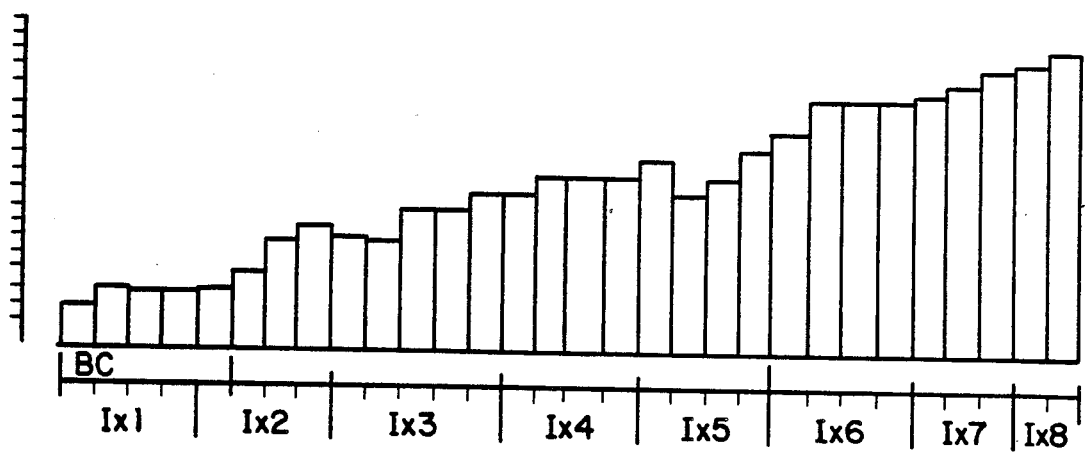
FIG—7

VOICE RECOGNITION SYSTEM

BACKGROUND OF THE INVENTION

1. Field of the Invention

The present invention relates to pattern recognition devices, and more particularly to recognition systems which distinguish spoken words.

2. Description of the Prior Art

Speech recognition by artificial intelligence has had extensive study and recent developments in this area are both numerous and complex. Along with these developments the understanding of the mechanisms of human speech and the mental functions evolved for the recognition thereof has improved. Nevertheless, complex and difficult patterns and functions are inherent and the increased understanding has not simplified, to any significance, the recognition task.

This difficulty is inherent in the phenomenon of speech. For example, the course of human speech includes variables in the mechanical structure of the voice generating mechanism, i.e., the voice box, which moreover varies from day to day along with the state of health of the person and with the psychological states one goes through. Additionally, the speech patterns uttered by a person vary with the message and with the intent the communicator desires to convey, and may be rushed or slowed down in response to external inputs which a recognition system would have difficulty to perceive.

These and the many other variables of communication, (i.e., concurrent body language) make voice pattern recognition an extremely complex task and the resulting systems are therefore extremely complex and limited.

Unlike human voice recognition the application of artificial recognition systems often involves functions not inherent to humans, like security functions, which modify the architecture of the logic and impose constraints of their own not always compatible with the recognition function. Thus, for example, an artificial recognition system may be structured not to recognize all voice patterns, being responsive to a selected group only. Moreover, limited lexicons are often preferrable to unlimited ones, particularly when security concerns exist.

For all these reasons specialized recognition systems have been sought in the past and it is one such system that is set out herein.

SUMMARY OF THE INVENTION

Accordingly, it is the general purpose and object of the present invention to provide a voice recognition system responsive to a selected number of spoken commands uttered by a user.

Other objects of the invention are to provide a voice recognition system structured to respond to commands following a particular word uttered by a user.

Yet additional objects of the invention are to provide a voice recognition system which in response to an unauthorized user will issue an alarm.

Briefly, these and other objects of the present invention are accomplished by providing an audio pick-up device, such as a microphone, deployed to continuously sense the adjacent sounds which are at a level above a selected threshold. The output of the microphone is then fed, through a bandpass filter set to pass the frequencies associated with human speech, to a high gain operational amplifier connected to operate as an absolute value comparator which thus acts as a zero crossing or squaring circuit swinging between saturation limits in accordance with the zero crossings of the voice pattern. As result the signal output of the operational amplifier forms a sequence of positive and negative pulses each of a duration or length equal to the zero crossing interval of the audio wave and the threshold band acts to reject a large portion of the background noise. These pulses are then measured for duration against the count of a continuously running clock and are then accumulated in a buffer as a series of bytes each carrying the clock count code of the corresponding pulse. Accordingly, the buffer contains a series of coded bytes representing the lengths of the successive pulses between the zero crossings of the audio signal. These code bytes are then inspected within a microprocessor for the count code in each byte and thus serve as the input to the recognition process.

The recognition process itself is conformed as a three part procedure, a procedure inscribed in the instruction memory (program) of the microprocessor. The first part of this procedure involves the process of developing a reference voice pattern of generalized dimension, i.e., a pattern characteristically descriptive of the voice box of the user. To effect this first part of the procedure the user selects a particular mode on a mode selector and then enunciates into the microphone all the words that he has as his command lexicon, i.e., all the words by which the user intends to communicate with the recognition system. These words then appear in the buffer as byte sequences which are then sorted according to the byte code and arranged in an ascending frequency (descending count) ranking. The number of bytes of each length, or count duration, are then accumulated in this ranked format for the complete command lexicon. As result a pulse activity pattern is developed which will contain the characteristic frequency (pulse length) form of the user's voice mechanism. Thereafter this pulse activity pattern is broken down into a fixed number of byte code (frequency class interval) groupings selected to provide groups of substantially equal pulse activity.

Accordingly, a pattern typical to each user is generated in the foregoing first part of the process, generating a reference pattern accumulating all the pulse lengths (counts) involved in all the words comprising the selected command lexicon. This reference pattern is then broken up into a set of frequency class intervals of approximately equal number of events or pulses in each interval. A set of frequency bands is thus formed each of approximately equal significance which is then used to classify each of the commands.

In the second portion the commands are again spoken into the microphone of the recognition system, one by one, each in association with an input indicating a desired response. During this pass each command is broken down according to the generalized frequency class intervals developed in the first, cumulative pass. This second pass may be repeated several times to develop an average profile for each separate command.

Thus, the loading sequence first entails the development of generalized frequency class intervals which assign equal significance to the respective pulse length groups and are then used as the dimensions on which the characteristics of each command are laid out. The command patterns are thus nondimensionalized with respect to the generalized voice pattern of the user, reducing one of the larger variables in any speech recognition process.

Additionally, each command, once received by the inventive recognition system, is segmented into a fixed number of segments so that a longer or a shorter command will appear as a pattern of equal number of segments. This allows for a comparison search against the word uttered regardless of the speed at which the user then speaks and regardless of the length of the command.

One should note that the foregoing process is not limited to single word commands since a multiple word command is equally expressed in terms of zero crossing pulse length counts. Simply, therefore, each command is stored as a fixed set of sequential segments each characterized by a count of pulses within a set of pulse width intervals.

To reiterate, the first two portions of the process first expose a relatively large group of sounds comprising the full user command lexicon which is then sorted in frequency for equal bands of pulse activity. The low frequency components (longer periods between zero crossings) thus receive the same significance as the higher frequency sounds (shorter pulses between zero crossings) by virtue of the normalization process into these class intervals. Once the class intervals are thus established the subsequent separate commands are broken down accordingly. Moreover, the foregoing distribution of the command into the previously selected class intervals is by equal number of segments, i.e., both the long commands are divided to an equal number subperiods. Of course, each segment of a shorter command will have fewer pulse repetitions in the various class intervals and one short command is distinguishable from another short command by the distribution of the pulses between the class intervals. In this manner the speaker is not constrained to utter the command at any particular speed, thereby excluding from the recognition task a substantial further variable while retaining the relatively fixed patterns associated with each voice box.

Analytically, the rank ordered by pulse length (or frequency) representation previously described is sorted into selected class intervals, i.e., pulse length groups, according to the relationship:

$$\sum_{r}^{r+x} N_{r-r+x} = \text{constant}$$

where:
N = the number of pulses;
r = the frequency ranking; and
x = the ranking interval selected to maintain the total pulse (zero crossing) count substantially equal.

The command is thus nondimensionalized in relation to time, being simply transformed into a count of pulses falling in the frequency class intervals. In this form a pattern for any word is generated as an equal number of segments each comprising pulse counts falling into an increment sequence which is solely set by the number of zero crossings. This transformed pattern thus sets the basis for the comparison in the third part of the recognition process.

The comparison itself is a continuously running process wherein the adjacent sounds picked up by the microphone (i.e., sounds which are above a selected threshold) separated by interword gaps of greater than a selected duration are similarly segmented into the fixed number of segments, each segment including pulse counts separated according to frequency class intervals (pulse lengths) described above. Once thus transformed the continuously monitored sounds are compared against the pattern of an entry word or command. If a match is found then the system issues a recognition signal, which may be in the form of a voice synthesized response to tell the user that the system is ready to accept a command.

The succeeding sound group is then received by the recognition system and similarly transformed for comparison against the stored command patterns in memory.

To execute the comparison sequence the microprocessor then selects several command patterns from the memory and compares this group against the transformed pattern of the uttered command both by segment and frequency interval. It is to be noted that both the uttered command and the words stored in memory are transformed in identical manners. Thus, the stored words are similarly segmented and broken down into the class intervals and the stored word corresponding to the uttered command will thus be distinguished by the closest correspondence.

The comparison process first compares, segment by segment, the uttered word transformation against the selected word patterns in the library (memory). This first comparison pass compares the pulse count of each class interval within the respective segments and the segment having the closest match in any one of the class intervals is then stored. Concurrently, a comparison is made, once again, by class interval and the library word having the smallest difference in any one interval is stored. If the same library word is thus selected in both instances the recognition is deemed correct. If not a further, numerical comparison is made where the closest word candidate is given more weight. Once this numerical comparison achieves a given numerical difference, the recognition is again completed. Otherwise the recognition is unresolved.

Each command, moreover, includes a common precursor, an entry word, like "SYDNEY", to invoke the full processing scan. The initial task of the system is therefore less complex allowing for continuous monitoring. Moreover, timing aperatures may be included which identify the typical interword gaps occurring in the course of a command, thus, further improving the filtering in the system of the background noise. With all these provisions a secure and reliable word recognition system is provided which can then be rendered useful in issuing execution signals in accordance with the command recognized.

BRIEF DESCRIPTION OF THE DRAWINGS

FIG. 3 is a diagrammatic illustration of one portion of the processor useful with the present invention;

FIG. 4 is a flow chart of one portion of the inventive processing sequence;

FIG. 5 is a graphical illustration of the transformation of data achieved in the course of execution of the flow chart in FIG. 4;

FIG. 6 is a further flow chart of another portion of the inventive processing sequence;

FIG. 7 is yet another chart illustrating the transformation of data achieved by the sequence in FIG. 6; and FIG. 8 is yet a further portion of the inventive processing sequence shown as a flow chart.

DESCRIPTION OF THE PREFERRED EMBODIMENTS

While the following description refers to logic examples implemented in several preferred manners, the implementations are illustrative only. It is to be understood that various choices are available in the marketplace and no intent to limit the scope of the invention is expressed by these selections.

For convenience in communicating the concepts of this disclosure the following nomenclature has been adopted:

(i) the term "command" refers to a word or group of words uttered by the user, which invoke a response once recognized by the inventive system;

(ii) the term "recognition algorithm" refers to a set of conditions, or truths, applied to a digital representation of a word by which it is sorted and compared against a selected group of previously stored digital representations of words;

(iii) the term "class interval" is an interval of accumulated frequencies or pulse width counts which has substantially equal pulse repetition occurrence;

(iv) the term "zero crossing" is the passing across a null potential of an audio signal, approximated to the tolerance of the background noise;

(v) the term "filtering aperture" refers to a clock count within which a sequence of audio signals must occur in order to continue the recognition process;

(vi) the terms "word library" or "lexicon" refer to a set of digital transformations of word sounds stored in memory and assigned to invoke predetermined responses;

(vii) the term "permanent memory" refers to any signal storage device which serially, or in random access, retains electrical signals or groups of signals for reference;

(viii) the term "scratch pad memory" refers to any temporary storage medium accessible for temporary use in the course of processing;

(ix) the term "segment" refers to a division in each continuous stream of audio signals such that each stream, regardless of its temporal length, is divided into an equal number of segments;

(x) the term "interword gap" refers to a period of relative audio inactivity used to distinguish the beginning of one continuous audio stream from the end of another. In this context the interword gap has some of the attributes of the filtering aperture excepting that the interword gap initiates the recognition sequence;

(xi) the term "processing" refers to logical electronic operations carried out in a predetermined sequence; and (xii) the term "microprocessor" refers to the general organization of logical devices through which processing can be carried out. In this context one should note that a grouping of digital devices like counters, adders, clocks and others can effect the processing entailed herein whether such grouping conforms to the structure of a commercial microprocessor or not.

Figure 1:
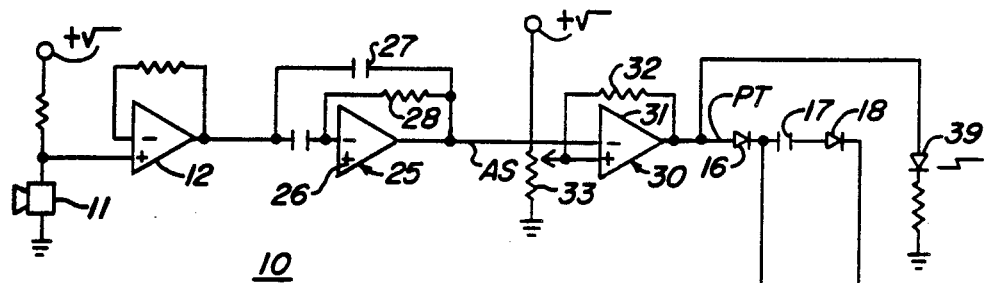
FIG. 1 is a circuit diagram of the inventive recognition system.

As shown in FIG. 1 the inventive system, generally designated by the numeral 10, comprises a microphone 11 tied to a preamplifier 12 which raises the audio signals from the microphone to a working level. The output of preamplifier 12 is then fed to an active band pass filter, generally at 25, comprising an operational amplifier 26 with an RC feedback including a feedback capacitor 27 and resistor 28 selected to provide a passing band of frequencies in the range of 400 to 3000 Hz. In this form the frequencies characteristically associated with human speech are passed as an audio signal AS while the higher, more confusing components are attenuated. This shaped or filtered audio signal AS is then fed to a snap action comparator, generally at 30, conformed once again, around an operational amplifier 31 tied to a positive resistive feedback 32 which couples with a wiper on a potentiometer 33 setting the hysteresis band. This reshapes those portions of the audio signal AS above the hysteresis level to a series of positive and negative pulses PT of a fixed amplitude set by the saturation limits of the operational amplifier. The length of each pulse, in turn, is determined by the zero crossings of the signal AS to the tolerance of the hysteresis band.

The signal output PT of comparator 30 is therefore a series of positive and negative pulses of an amplitude set by the saturation limits of the amplifier and each of a period bounded by the zero crossings of the audio wave. Since audio is substantially symmetrical the positive limit pulses are generally equal to the negative limit pulses and only one side need be inspected in the course of any recognition sequence, and is thus achieved by a diode 16.

The recognition process may be carried out within a microprocessor 50 of any conventional configuration exemplified by a microprocessor Model No. 6502 made by Rockwell International and characterized by a clock 51, an arithmetic logic unit (ALU) 52, a memory 60 and the necessary bus or network 53 interconnecting all of the foregoing with an input buffer 41 and an output port 42. In this form the microprocessor can carry out sequences of operational instructions including the recognition system described herein. Such instructions may be inscribed into a ROM 65 which together with a scratch pad RAM 66 and a mass memory 67, form the memory 60.

To accommodate this recognition process an input stage is provided between processor 50 and the linear elements set out above, this interface stage including a counter 35 clocked by a clock 36 and enabled by the signal PT as rectified by diode 16. The negative going transient of the signal PT may then be used to clear the counter and to transfer the binary count code in the counter into buffer 41. This negative going transient may be variously implemented, the implementation herein being by way of a capacitor 17 in series with a diode 18 on the signal PT.

As result a binary coded count byte is transferred into buffer 41 at the completion of each pulse in the pulse train PT and the buffer will therefore contain a group of such bytes representing a command as discerned and shaped by the microphone circuit. During the course of this transfer buffer 41 issues a buffer busy signal BB into the bus 53 which supresses the recognition processing in the microprocessor. Each time signal BB goes low an interrupt sequence is invoked to initiate processing which, because of the number of execution cycles therein, requires a predetermined period to complete. It is this period that has been previously defined as the interword gap. If the processing cycle is still proceeding while the next byte is brought down into the buffer 41 signal BB inhibits the processing, invoking a clear and reset in the instruction counter to ROM 65 to reset the process to the beginning. Moreover, if this process of loading the buffer continues until the buffer overflows, yet another buffer overflow signal BO enters bus 53 suppressing all further processing and clearing the buffer.

In the foregoing arrangement buffer 41 takes the generic form of a byte shift register, shifted and loaded by the negative transient on signal PT. As in all shift registers a register overflow signal is provided and it is this overflow signal that is set out herein as signal BO.

Figure 2:
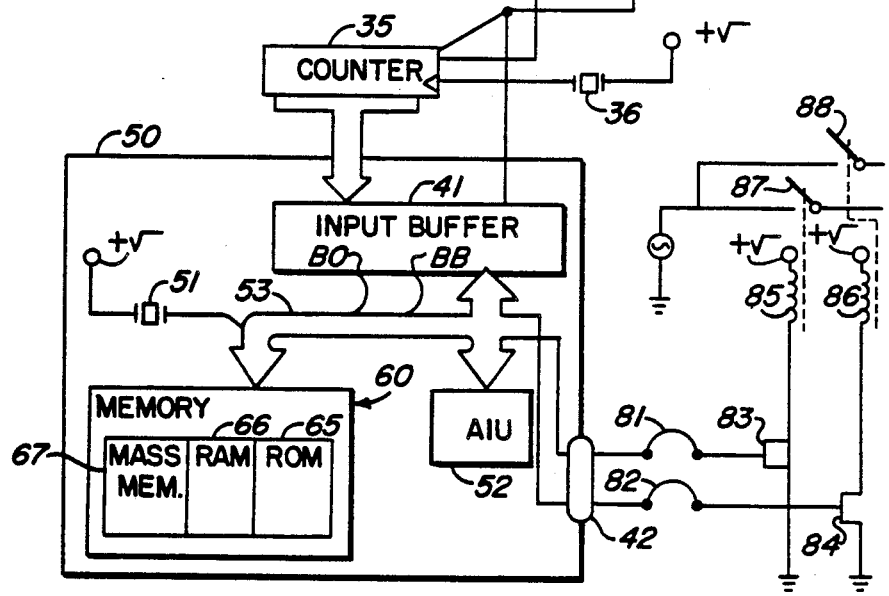
FIG. 2 is a group of charts illustrating the transformations carried out by the inventive system.
Figure 2:
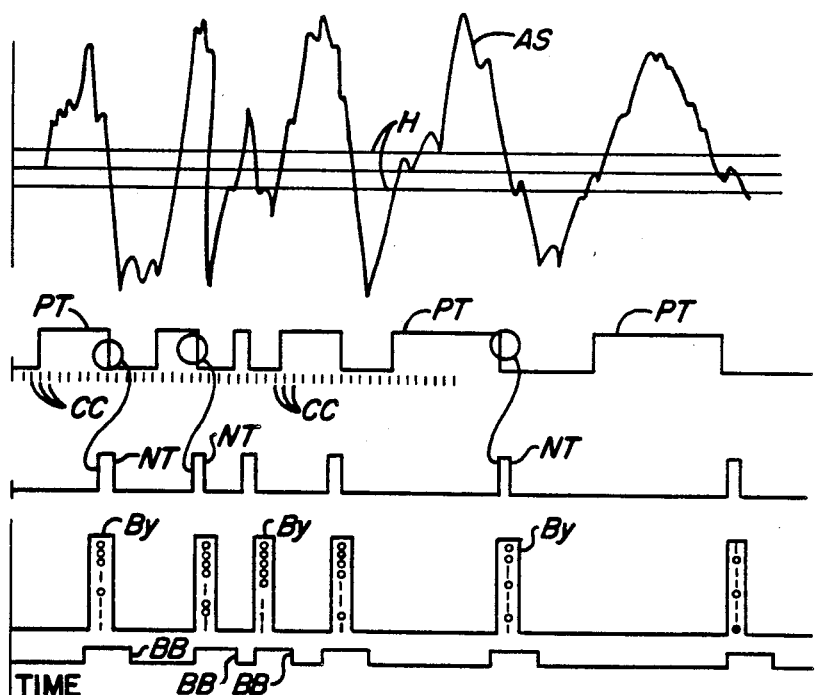

By reference to FIG. 2 the audio signal AS exceeding the hysteresis band H of comparator 30 generates the foregoing pulse train signal PT which only reflects one side of the audio, as rectified by diode 16. This pulse train PT is clocked by the clock 36, shown as the clock signal CC. By selecting a bit width in counter 35 and an appropriate clock rate CC a binary count in the counter is developed which accommodates the width of the bandpass filter 25. Thus, the lowest frequency audio passed by the filter will result in a count of 255 clock cycles CC when the counter 35 is conformed as an 8 bit wide binary counter, and at the upper end a one-bit count is developed. Accordingly, each pulse in the pulse train PT will result in an eight bit wide binary code word or byte BY at the output of the counter which is loaded into buffer 41 at each negative going transient NT passed by capacitor 17 and diode 18. Each of the signals NT unload and clear the counter transferring an eight bit wide byte BY, in binary code, representing the count or duration of the pulse PT then ending.

Thus, buffer 41 receives an asynchronous stream of the bytes BY which are shifted upon each new entry. Accordingly, the contents of this buffer appear like the chart carrying the byte stream BY in FIG. 2. It is this byte stream that provides the basis for the processing that now follows.

More specifically, as shown in FIG. 3, ROM 65 operates in conjunction with an address decoder 165 which selects the address of the instruction II therein. Each selected instruction is then fed to an instruction register 166, and depending on the instruction the normal ADD, JUMP, STORE, GO TO(and others) operations are invoked, invoking transfers of data and instructions into bus 53 which is tied to the RAM 66, ALU 52, and buffer 41. Thus, the instructions II control the processing sequence within the microprocessor 50.

Of course, those skilled in the art will appreciate that additional house keeping functions are involved in the microprocessor, such as housekeeping functions entailing gating and timing of the data flow and functions that interrupt the progression of any instruction claim to accomodate competing tasks. These are all typically provided in any commercially available microprocessor. Included amongst these are signals which suppress the advancement of the address decoder 165 and address register 166 and it is on one such signal that the signal BB is impressed. Additionally, manual external inputs are available which modify or select the code or instruction sequence in the ROM shown herein as signals MS originating from manual switches 168 and 169. These manual switches thus select the address space in ROM 65 and therefore the processing sequence performed thereby.

In the first mode selected by switches 168 and 169 the procedure for generating the voice box reference pattern is invoked from amongst the instructions in the instruction set II. In accordance with this procedure, shown as a flow chart in FIG. 4, the user enunciates the commands, one by one, into microphone 11 which then appear as byte series BY in buffer 41. Address register 165 then transfers these bytes by into RAM 66, per cycle 301. Thereafter, in cycle 302, the bytes BY are sorted in accordance with the binary code thereof and rank ordered by length or count in cycle 303.

In cycle 304 the number of bytes is accumulated and this number is stored in RAM 66 for each byte code. This process continues as long as switch 168 remains closed, a condition tested in cycle 305. If the switch is open, indicating that the user has completed enunciating his full lexicon the process drops down to cycle 306 where the total number of bytes NB is summed up, across all the sorted categories of binary code, and divided by a fixed number, e.g., eight. The result of this division, a number INP, is then stored in RAM 66.

In cycle 307 the number of bytes NB is accumulated across the binary code rank ordering until the INP number is reached. At this point the binary code of the code group satisfying this condition is recorded in memory 66 at assigned address coordinates as the first class interval. This is repeated in cycle 308 until the 255th rank is reached.

As a consequence RAM 66 will include, at preselected locations, the values X1-X8 corresponding to the eight class intervals of frequency in which the pulse activity $\Delta$NB is approximately equal. Graphically this same process is shown in FIG. 5 wherein the pulse or byte number NB is displayed across the binary counts BC in a binary count rank ordered sequence and the intervals in the binary count having substantially equal intervals of pulse counts NB are bounded by X1 through X8. It is these intervals referred to as IX1-IX8 that are thereafter used in all further processing.

In the second portion of the processing sequence the user, once again, enunciates the commands in sequence, this time, however, with switch 169 depressed or closed. This switch signal invokes another routine in the address register 165 and therefore ROM 65 which is described by reference to FIG. 6. In this routine cycle 101 accumulates, by adding, all the binary counts in buffer 41 with the sum $\Sigma$BY representing an approximate clock length (temporal length) of the command word, stored in RAM 66, and then divided into equal segments, e.g., six in cycle 102 to get the segment length IBY. Having thus obtained the segment length the respective bytes BY are categorized into the segments in cycle 103 and sorted according to the frequency intervals IX1 through IX8 in cycle 104 and the process is continued until all the bytes in each segment are accumulated in cycle 105. As result a pulse or byte count, sorted for each class interval, is made and stored for each segment. Accordingly, the command is then transformed into a six segment by eight interval format and is thus transferred to the mass memory 67 in cycle.

The resulting representation is then shown in FIG. 7 where the number of bytes NB in each segment M1-M6 are distributed in accordance with the class intervals Ix1-Ix8. Moreover, the commands as they are thus stored, may be stored in association with patched connections, shown in FIG. 1 as connections 81 and 82 which connect the entered command at the output port 42 to the appropriate field effect transistors (FETS) 83 and 84 in circuit with relay coils 85 and 86 which pull in appropriate switches 87 and 88 to operate the various devices under the control of the inventive recognition system.

The recognition process itself, shown by the process sequence in FIG. 8, once again receives the audio in microphone 11 and converts this into a stream of bytes BY shifted into the buffer 41. It is to be noted that in this mode neither switches 168 or 169 are closed and the potentiometer 33 in FIG. 1 is trimmed to ignore the ambient sounds as indicated by a light emitting diode 39. With these initial conditions step 201 obtains the byte data BY from buffer 41 including the buffer overflow signal BO. In step 202 the BO signal is inspected and if buffer overflow is indicated (BO is high) an instruction 203 clears the buffer. If signal BO is not high then the process continues to yet another branch step 204 which tests the contents of buffer 41 for a byte number less than a predetermined number R. If the condition is not met then a wait loop 205 is involved allowing the buffer to continue to loading and at the conclusion of the wait the process returns to step 201. If the minimum number R of bytes is met then the process continues to step 206 which transfers the sequence to cycle 101 in FIG. 6. In this cycle sequence the end test, i.e. test 107, checks if the switches 168 and 169 are closed and if not returns to step 207 in FIG. 8.

Accordingly, the routine laid out in FIG. 6 is also incorporated in the recognition sequence. The stored command patterns are therefore generated in an identical manner with the transformation of the audio signal monitored. Step 207, therefore, involves the bringing up from memory 67 the pattern for the entry word, referred to herein as word EN having a byte number BN pattern distributed by segments M1-M6 and by class intervals IX1-IX8. This brought up pattern is then compared in step 208 interval by interval and segment by segment and if the sum of the differences ΔNB is less than a given value Q a branch step 209 occurs which continues the process. If not the routine returns to step 201 to resume the monitoring process for the entry word EN.

When the condition is met buffer 41 is cleared in step 210 and one of the outputs, e.g., FET 83, is turned on. This then may set off a voice synthesizer (not shown) or any other response requesting the next command from the user. Concurrently, in step 211 the command words WD1, WD2 and WD3 et cetera, are brought up from the library in coordinates of byte numbers BN in segments M1-M6 and intervals IX1-IX8 and the new contents of buffer 41 are brought down in step 212 followed by the sequence of steps like steps 202-206 which is summarily stated in step 213. Th is sequence, once again, branches to step 101 of FIG. 6 segmenting and sorting the most recent contents of buffer 41. When the buffer contents are thus again segmented and sorted by interval a comparison is made with the patterns of the library words WD1, WD2, WD3, etc. in step 214 and the word number having the least difference in any interval is stored for each segment in step 215. Thereafter, in step 216, yet another comparison is made and the difference Δ is accumulated across all segments M and intervals IX for each library word. The word number having the least cumulative difference ΔM, IX is, once again, stored in step 217. In step 218 the word numbers stored in step 215 are compared against the word number stored in 217 and if they compare the word is recognized. If not, the comparison of step 214 is weighted in step 219 such that the word having the most number of segments is given the highest weight and the resulting most preferred word is stored in step 220 and compared with the word stored in step 217 in the branch step 221.

If there is a comparison the word is recognized and if not a word unrecognized signal is returned to the user.

Thus, a recognition system based on frequency intervals of equal activity is provided in which fairly wide frequency increments are involved. Accordingly, only a coarse spectral analysis is required enhancing the speed and simplicity of any recognition calculations.

Additionally, the library of commands may be segmented into groups which always occur in a given order, e.g., the command to turn the lights on or off will always appear as a sequence of the words "Lights" followed by "on" or "off". Thus the first search after the entry word will only refer to the function category which includes a list like "Lights", "Television", "Heater", "Air conditioner", etc. and only thereafter are operational words like "on", "off" involved. There is, therefore, a logical reduction of the library search sequence which is reflected by the "group 1, n" entry in steps 214 and 216.

In this manner a simple recognition scheme is set out which can be conveniently accomodated in conventional hardware and which, because of the interval selection, is normalized to the speech patterns of the user.

Obviously, many modifications and changes may be made to the foregoing without departing from the spirit of the invention. It is therefore intended that the scope of the invention be determined solely on the claims appended hereto.

What is claimed is:

1. A speech recognition system comprising:
   an audio sensing circuit conformed to provide a sequence of pulses each of a length corresponding to the length of an audio wave;
   buffer memory means conformed to receive and store a sequence of count codes each corresponding to the length of a respective one of said pulses; and
   sorting means operatively connected to receive said count codes from said buffer memory means and conformed to sort said count codes into preselected class intervals of count groups,
   said class intervals of count groups being selected to include a substantially equal number of pulses produced in the course of speech.

2. Apparatus according to claim 1 wherein:
   said audio sensing circuit includes a bandpass filter conformed to pass the frequency bands associated with human speech.

3. A method for recognizing words uttered by a user comprising the steps of:
   converting the audio wave forms characterizing said words into pulses of a length corresponding to said waves;
   producing a serial stream of count codes indicative of the duration of each said pulses;
   sorting said count codes in accordance with the count thereof and accumulating the number of occurrences of a count code according to preselected count intervals; and
   storing said number of count codes in each said interval;
   said count intervals are preselected to provide a substantially equal count number accumulated for all said words uttered by the user.

4. A method according to claim 3 wherein said step of producing a serial stream further comprises the steps of:
   accumulating said count codes to produce a sum thereof;

dividing said sum by a predetermined integer number to produce segments of count codes; and selecting said serial stream of count codes from each segment.

5. A method according to claim 3 further comprising:

comparing the count codes of a word uttered by the user and selected according to said segments and sorted according to said intervals with said stored selected and sorted count codes.

6. Apparatus for providing a predetermined response signal uniquely associated with the reception of a particular word uttered by a user comprising:

a microphone deployed to sense the audio waves characterizing each said word for producing an electrical signal indicative thereof;

filtering means connected to receive said electrical signal for producing an output signal attenuated in selected frequency components thereof;

pulse generating means connected to said filtering means for producing a sequence of pulses each of a length corresponding to the duration between zero amplitude crossings of said output signal; and signal processing means connected to receive said sequence of pulses from said pulse generating means, said signal processing means including:

(a) pulse length counting means connected to receive each said pulse for producing a count code byte of a code corresponding to the length of said pulse at the completion of each said pulse;

(b) sorting means operatively connected to receive said count code bytes for sorting thereof into predetermined intervals of count code and for storing the number of bytes sorted in each said interval said count code intervals being each selected to include a substantially equal number of count bytes accumulated for all said byte number patterns;

(c) memory means conformed to store reference byte number patterns in accordance with said intervals; and (d) comparison means connected to receive said byte numbers sorted in accordance with said intervals in said sorting means and said reference byte number patterns for producing said response signal upon a coincidence therebetween within a predetermined tolerance.

7. Apparatus according to claim 6 wherein:

said filtering means is selected to pass frequencies between 300 and 3000 cycles per second and to attenuate all other frequencies.

8. Apparatus according to claim 7 wherein:

said count code intervals are each selected to include a substantially equal number of count code bytes accumulated for all said byte number patterns.

9. Apparatus according to claim 8 wherein:

said filtering means is selected to pass frequencies between 300 and 3000 cycles per second and to attenuate all other frequencies.

* * * * *